(12) United States Patent
Liberato, Jr. et al.

(10) Patent No.: US 10,134,004 B1
(45) Date of Patent: Nov. 20, 2018

(54) PROCESSING IMAGE DATA FROM A CAMERA CLUSTER

(71) Applicant: Amazon Technologies, Inc., Seattle, WA (US)

(72) Inventors: Frank Florian Liberato, Jr., Kirkland, WA (US); Daniel Bibireata, Bellevue, WA (US); Muralidhar Koka, Kirkland, WA (US); Yasser Baseer Asmi, Redmond, WA (US); Nishitkumar Ashokkumar Desai, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 14/582,015

(22) Filed: Dec. 23, 2014

(51) Int. Cl.
*G06Q 10/08* (2012.01)
*G06Q 20/20* (2012.01)

(52) U.S. Cl.
CPC .................................. *G06Q 10/087* (2013.01)

(58) Field of Classification Search
USPC ............................. 705/28; 382/115; 235/375
See application file for complete search history.

(56) References Cited

U.S. PATENT DOCUMENTS

| 7,225,980 | B2 | 6/2007 | Ku et al. | |
|---|---|---|---|---|
| 7,504,949 | B1 * | 3/2009 | Rouaix | G06Q 10/06 235/375 |
| 7,689,465 | B1 | 3/2010 | Shakes et al. | |
| 7,949,568 | B2 | 5/2011 | Fano et al. | |
| 8,009,864 | B2 | 8/2011 | Linaker et al. | |
| 8,175,925 | B1 | 5/2012 | Rouaix | |
| 8,189,855 | B2 | 5/2012 | Opalach et al. | |
| 8,423,431 | B1 | 4/2013 | Rouaix et al. | |
| 8,630,924 | B2 | 1/2014 | Groenevelt et al. | |
| 8,688,598 | B1 | 4/2014 | Shakes et al. | |
| 9,072,929 | B1 * | 7/2015 | Rush | G09B 19/003 |
| 9,473,747 | B2 | 10/2016 | Kobres et al. | |
| 2003/0002712 | A1 | 1/2003 | Steenburgh et al. | |
| 2003/0174772 | A1 | 9/2003 | Voronov et al. | |
| 2004/0181467 | A1 | 9/2004 | Raiyani et al. | |
| 2006/0056056 | A1 | 3/2006 | Ahiska et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Scott A Zare
*Assistant Examiner* — Reva R Danzig
(74) *Attorney, Agent, or Firm* — Athorus, PLLC

(57) ABSTRACT

Described is a multiple-camera system for use in capturing images of users within a materials handling facility and processing those images to monitor the movement of users. For large materials handling facilities, a large number of cameras may be required to monitor the facility. Processing of the data generated from a large number of cameras becomes difficult. The implementations described herein include a hierarchy that allows image data from any number of cameras within a materials handling facility to be processed without substantially increasing the processing time needed or sacrificing processing capabilities.

14 Claims, 11 Drawing Sheets

(56) References Cited

U.S. PATENT DOCUMENTS

| | | |
|---|---|---|
| 2006/0222211 A1* | 10/2006 | Olivo, Jr. ............ G06K 9/00885 382/115 |
| 2007/0115351 A1 | 5/2007 | McCormack |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2009/0303328 A1 | 12/2009 | Miyawaki et al. |
| 2010/0134614 A1 | 6/2010 | Aman |
| 2011/0011936 A1 | 1/2011 | Morandi et al. |
| 2011/0135154 A1* | 6/2011 | Wedge ................ G06K 9/6202 382/103 |
| 2012/0250834 A1 | 10/2012 | Smith et al. |
| 2012/0274808 A1 | 11/2012 | Chong et al. |
| 2012/0284132 A1 | 11/2012 | Kim et al. |
| 2013/0076898 A1 | 3/2013 | Philippe et al. |
| 2013/0169822 A1 | 7/2013 | Zhu et al. |
| 2013/0253700 A1 | 9/2013 | Carson et al. |
| 2014/0279294 A1 | 9/2014 | Field-Darragh et al. |
| 2014/0347475 A1 | 11/2014 | Divakaran et al. |
| 2015/0019391 A1 | 1/2015 | Kumar et al. |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

PROCESSING IMAGE DATA FROM A CAMERA CLUSTER

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
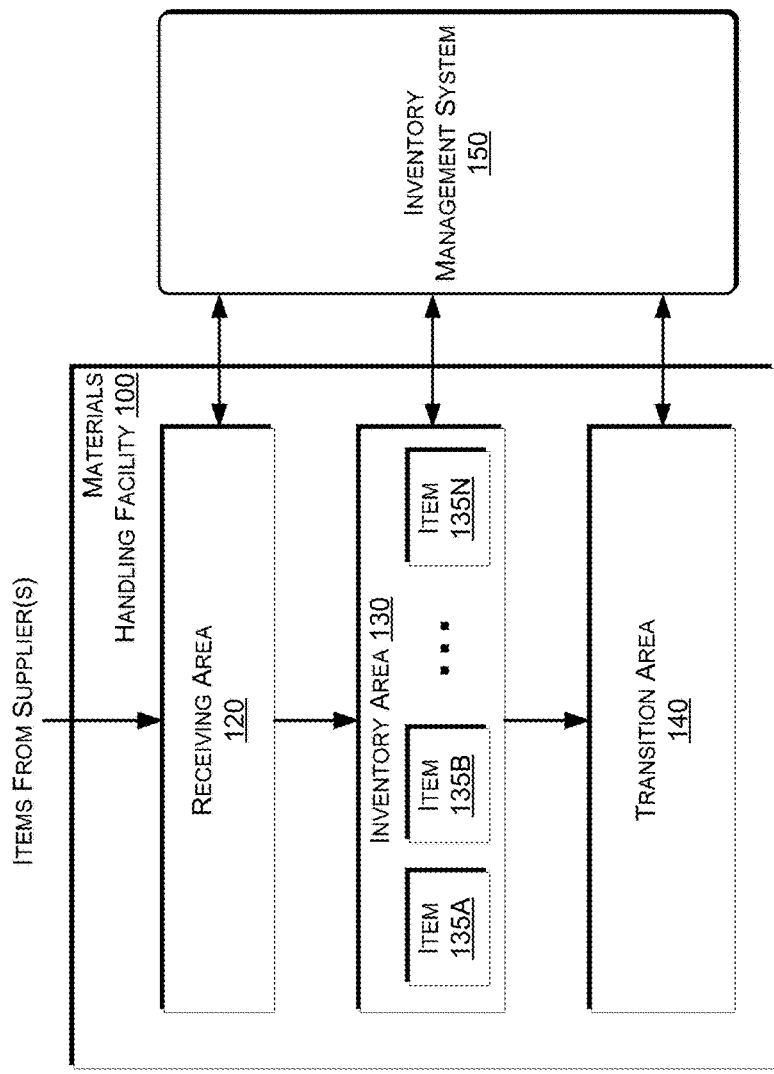
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), physical or wireless, mechanical, chemical, optical, analog, digital, or electrical.

DETAILED DESCRIPTION

This disclosure describes a multiple-camera system for use in capturing images of users within a materials handling facility and processing those images to monitor the movement and location of users. As materials handling facilities increase in size it is difficult to efficiently monitor all of the inventory locations without automation, such as cameras. However, with larger facilities, the amount of data generated by the multiple cameras needed to cover the larger facility, processing and management of the data becomes difficult. For example, a five-thousand square foot materials handling facility will need at least one-hundred cameras to provide coverage of the area within the materials handling facility. Larger materials handling facilities, e.g., twenty-thousand square feet, will require thousands of cameras to provide coverage.

The implementations discussed herein solve those problems using a distributed hierarchical system. For example, the cameras within a materials handling facility may be divided up into clusters for processing. For example, in large facilities (e.g., 40,000+ square) that require thousands of cameras to provide visual coverage of the entire facility, the cameras may be divided into clusters of 300-500 cameras per cluster.

Cameras within each cluster may be positioned at defined locations and orientations within the materials handling facility so that images obtained by those cameras can be correlated with a physical layout of the materials handling facility. Images may be obtained by each of the cameras of a cluster and provided to a cluster processing system. In some implementations, there may be a one-to-one relationship between clusters and cluster processing systems.

Segmenting cameras into clusters in which image data from each cluster is processed using a corresponding cluster processing system allows scalability of the implementations discussed herein without loss of speed and/or accuracy in processing of image data. For example, if additional cameras are added to a materials handling facility, those additional cameras may be associated with an additional cluster processing system and that additional cluster processing system may process the generated image data without impacting the processing of other image data.

As discussed further below, each cluster processing system may process received image data to determine user patterns representative of users located in an area of the materials handling facility that corresponds to the cluster of cameras. A location of each user pattern in the physical space of the materials handling facility may likewise be determined. A session identifier, which may be any identifier, such as a random number, may also be generated and associated with the user pattern.

Each of the cluster processing systems may communicate with a cluster aggregation system. For example, each of the cluster processing systems may send the session identifier and location information determined for each user pattern to the cluster aggregation system. The cluster aggregation system aggregates the information received from each of the cluster processing systems and utilizes the information to determine a location of each user within the materials handling facility. Likewise, each session identifier may be normalized to a user identifier that may be provided to other systems along with location information. For example, the cluster aggregation system may provide user location information and corresponding user identifiers to an inventory management system for use in associating items with a particular user of the materials handling facility. For example, if an item pick of an item from an inventory location is detected, the inventory management system may determine, based on the information received from the cluster aggregation system, the user that performed the item pick and thereby associate the picked item with the user.

By separating the processing of image data into a hierarchal system, large areas of materials handling facility may be monitored using clusters of cameras and a unified representation of the entire materials handling facility may be generated and maintained without affecting the speed and accuracy offered by systems that utilize fewer cameras and/or less data.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from the inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory area, moved a distance and placed at another location.

Figure 2:
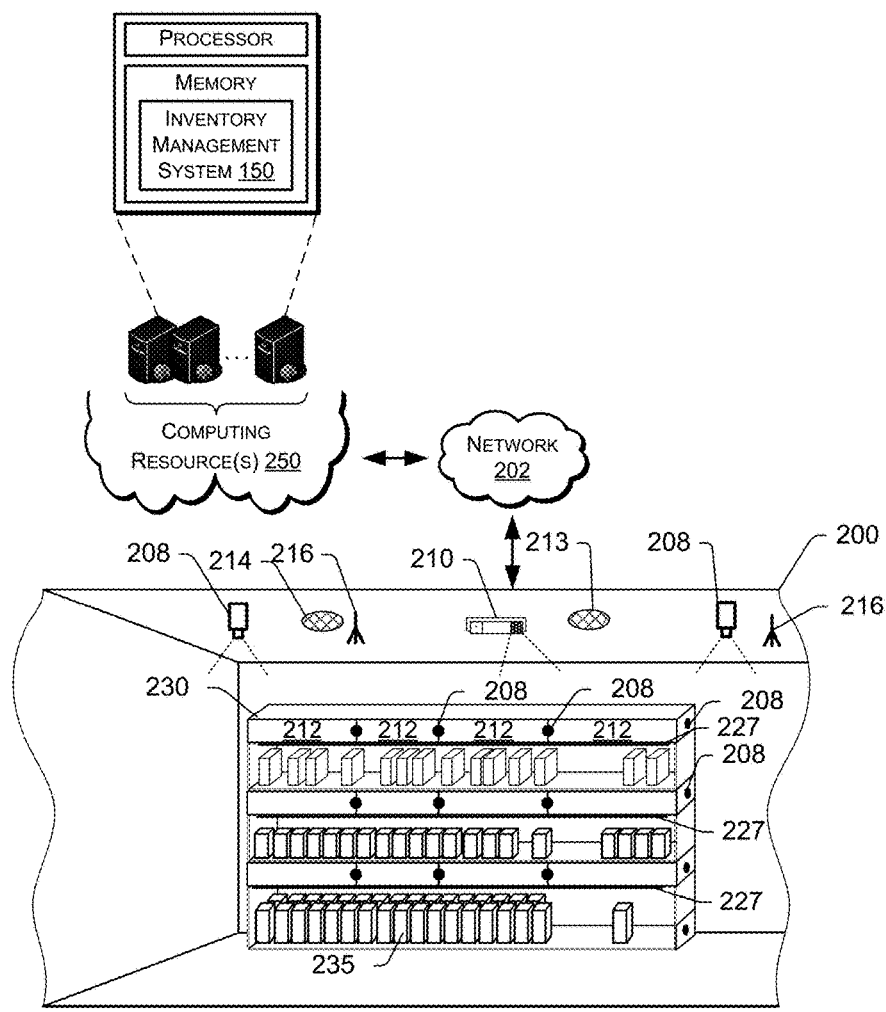
FIG. 2 shows additional components of the materials handling facility of FIG. 1, according to an implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more multiple-camera apparatus 227 may be positioned within the inventory areas to capture images of items stored in the inventory areas.

Any type of camera and/or configuration of cameras may be used with the implementations described herein. For example, one or more of the cameras may be a red, green, blue ("RGB") color camera, still camera, motion capture/video camera, etc. In other implementations, one or more of the cameras may be depth sensing cameras, also referred to herein as a RGBD camera. In still other implementations, one or more of the cameras may be a thermographic or infrared (IR) camera, etc. In some implementations, the cameras may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise configured to provide the image data to other components (e.g., a graphics processing unit) for processing. In some implementations, cameras may be paired to provide stereo imagery and depth information. A stereo camera may include a pair of camera modules. Image data may be stored in any variety of formats including, but not limited to YUYV, RGB, RAW, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green or blue) expressed in the reflected light, and store values associated with the pixel colors as image data and/or transmit image data to another device for further analysis or reproduction. The camera may also be configured to determine depth information, such as the distance between the camera and an object in the field of view of the camera. Depth information may be included in the image data generated by the camera.

Information and/or data regarding features or objects represented in a digital image may be extracted from the image in any number of ways. For example, a color of a pixel, or a group of pixels in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, radio frequency identifier ("RFID") readers, etc., may be utilized with the implementations described herein. For example, a pressure sensor and/or a scale may be used to detect the presence or absence of items and/or to determine when an item is added and/or removed from inventory areas. Likewise, a light curtain may be positioned to cover the front of an inventory area and detect when an object (e.g., a user's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location.

Alternatively, or an addition thereto, the inventory shelf may include one or more antenna elements coupled to an RFID reader that are configured to read RFID tags of items located on the inventory shelf.

When a user arrives at the materials handling facility 200, one or more images of the user may be captured and processed. For example, the images of the user may be processed to identify the user. This may be done using a variety of techniques, such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, etc.

The captured images and/or other inputs may also be used to establish a user pattern for the user while located in the materials handling facility 200. The user pattern may identify an overall shape, size, height, etc. of the user and/or any distinguishing identifiers (e.g., color of shirt, height) that may be used to assist in the identification and/or tracking of the user as they progress through the materials handling facility 200.

In some implementations, a user located in the materials handling facility 200 may possess a portable device and obtain information about items located within the materials handling facility 200, receive confirmation that the inventory management system 150 has correctly identified items that are picked and/or placed by the user, receive requests for confirmation regarding one or more event aspects, etc. Generally, the portable device has at least a wireless module to facilitate communication with the inventory management system 150 and a display (e.g., a touch based display) to facilitate visible presentation to and interaction with the user. The portable device may store a unique identifier and provide that unique identifier to the inventory management system 150 and be used to identify the user. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the inventory management system 150. Likewise, components of the inventory management system 150 may interact and communicate with the portable device as well as identify the user, communicate with the user via other means and/or communicate with other components of the inventory management system 150.

Generally, the inventory management system 150 may include one or more input/output devices, such as imaging devices (e.g., cameras) 208, projectors 210, displays 212, speakers 213, microphones 214, multiple-camera apparatus 227, illumination elements (e.g., lights), etc., to facilitate communication between the inventory management system 150 and/or the user and detection of items, events and/or other actions within the materials handling facility 200. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, which facilitate wireless communication (e.g., Wi-Fi, Near Field Communication (NFC), Bluetooth) between the inventory management system 150 and other components or devices. The inventory management system 150 may also include one or more computing resource(s) 250, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the components and devices can connect to and communicate with the inventory management system 150. For example, when the user picks an item 235 from an inventory area 230, a camera of the multiple-camera apparatus 227 may detect the removal of the item and the inventory management system 150 may receive information, such as image data of the performed action (item pick from the inventory area), identifying that an item has been picked from the inventory area 230. The event aspects (e.g., user identity, action performed, item involved in the event) may then be determined by the inventory management system 150.

Figure 3:
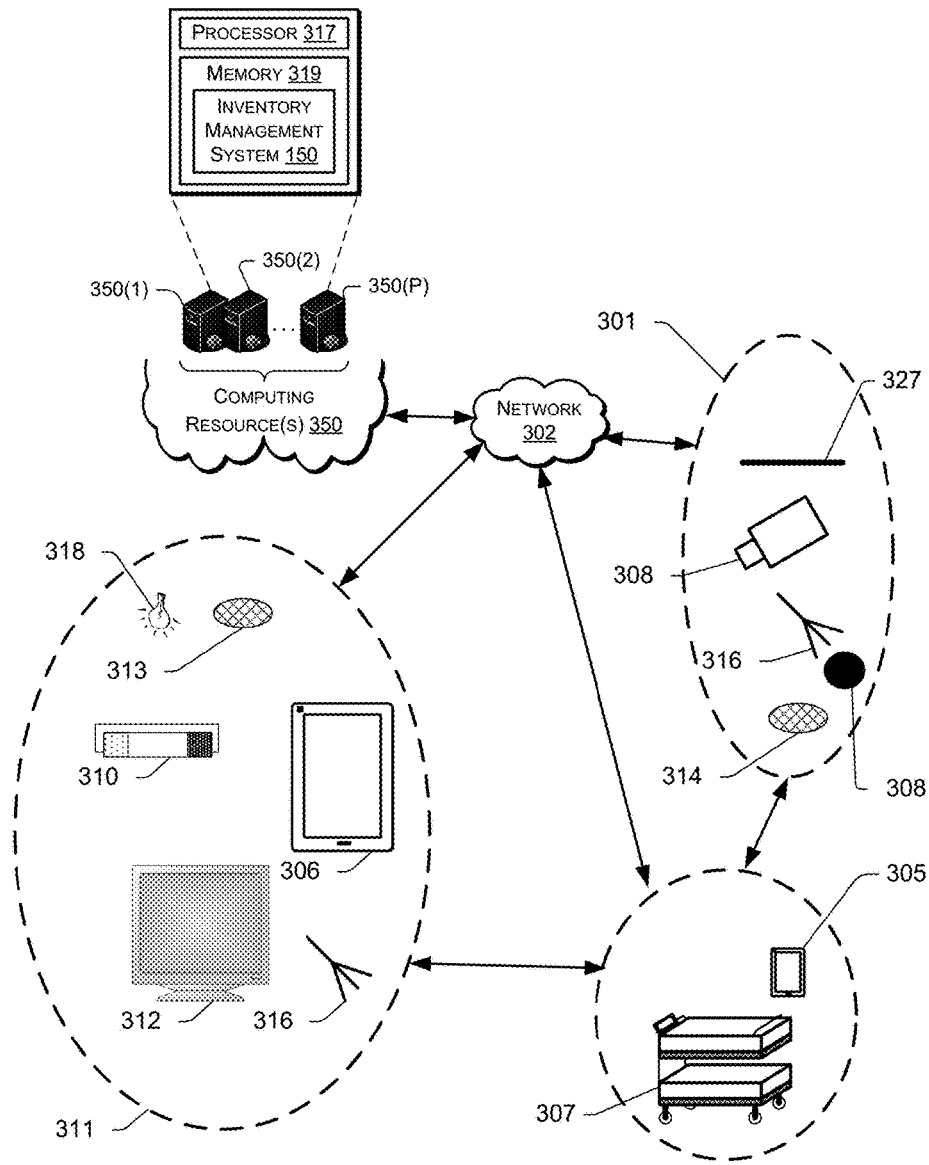
FIG. 3 shows components and communication paths between component types utilized in a materials handling facility of FIG. 1, according to an implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 350. The input components 301 may include an imaging device 308, a multiple-camera apparatus 327, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 350. The computing resource(s) 350 may be local to the environment (e.g., materials handling facility), remote from the environment, or any combination thereof. Likewise, the computing resource(s) 350 may be configured to communicate over a network 302 with input components 301, output components 311 and/or directly with the portable device 305, a user and/or the tote 307.

As illustrated, the computing resource(s) 350 may be remote from the environment and implemented as one or more servers 350(1), 350(2), . . . , 350(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 350 may process images of users to identify the user, process images of items to identify items, determine a location of items and/or determine a position of items. The server system(s) 350 does not require end-user knowledge of the physical location and configuration of the system that delivers the services. Common expressions associated for these remote computing resource(s) 350 include "on-demand computing," "software as a service (SaaS)," "platform computing," "network-accessible platform," "cloud services," "data centers," and so forth.

Each of the servers 350(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
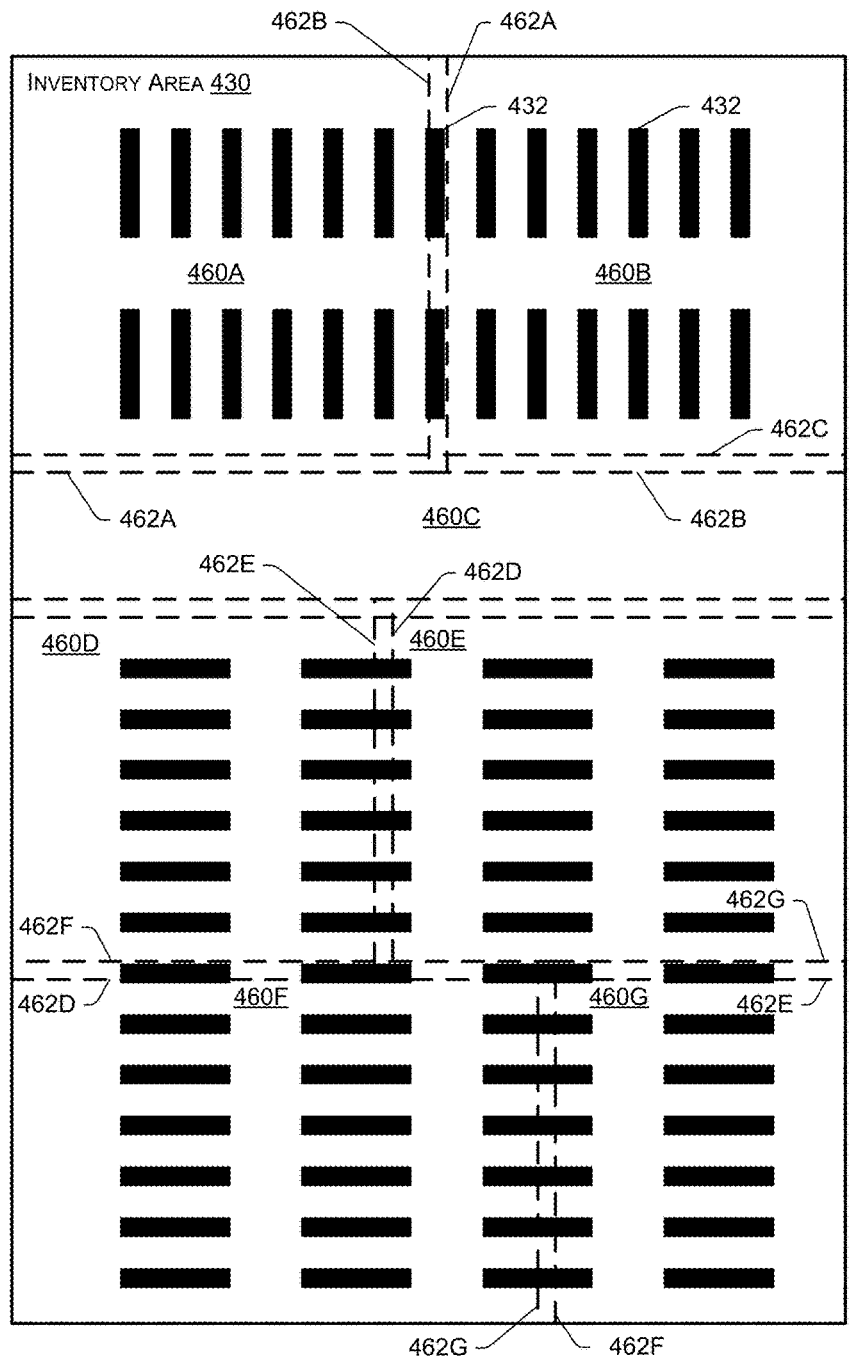
FIG. 4 is a block diagram of a top-down view of an inventory area within a materials handling facility segmented into clusters, according to an implementation.

FIG. 4 is a block diagram of a top-down view of an inventory area 430 within a materials handling facility segmented into clusters 460, according to an implementation. As materials handling facilities increase in size, the number of cameras need to monitor the materials handling facility likewise, increases. With typical monitoring systems that utilize a single computing system, as the number of cameras and/or image data increases, the speed of processing will likewise increase and/or the complexity, and thus, accuracy of the algorithms used to process the images decreases. With the implementations described herein, hundreds of cameras may be supported using a single hierarchy of computing systems without significantly impacting speed or performance. For example, in some implementations, a single hierarchy of computing systems may be utilized to support up to five hundred cameras without decreasing the speed of image processing and/or sacrificing algorithm complexity or accuracy.

The camera hierarchy includes a first layer of cameras and computing components located within the materials handling facility that capture image data and reduce the image data, as discussed below with respect to FIG. 8. The reduced image data is then provided to a cluster processing system that processes the reduced image data to determine user patterns representative of users represented in the reduced image data. For each determined user pattern, a location of the user pattern with respect to the material handling facility is determined and a session identifier is associated with the user pattern to aid in monitoring a location of the user pattern. Processing of the reduced image data is discussed further below with respect to FIG. 9.

The cluster processing system then provides the location information and session identifier for each determined user pattern to a cluster aggregation system that determines a user identifier corresponding to the user pattern. The cluster aggregation system may also determine an anticipated trajectory or direction of movement of each user. Cluster aggregation is discussed further below with respect to FIG. 10. The user identifier and location information may be provided to other services or systems, such as the inventory management system.

For materials handling facilities that include more than a maximum number of cameras that can be supported with a single hierarchy of computing systems, the cameras within the materials handling facility may be segmented into clusters 460 and additional cluster processing systems may be added, one for each additional cluster. Each of the cluster processing systems receive image data from a respective cluster of cameras, processes the received image data and provides user pattern location information to the cluster aggregation system. The cluster aggregation system consolidates the received information from each of the cluster processing systems and provides a unified representation of the materials handling facility that includes location information for each user within the materials handling facility.

As discussed further below with respect to FIG. 5, the cameras within the materials handling facility may be positioned at defined locations and orientations within the materials handling facility. For example, the cameras may be positioned a defined distance above a surface (e.g., floor) of the material handling facility and facing straight down so that they have zero degrees of tilt in the vertical direction. Likewise, the cameras may be separated defined distances from one another so that the field of view of each camera collectively covers the entire surface, or a defined portion thereof, of the materials handling facility.

As part of the camera placement, the cameras may be positioned so that the boarders 462 between clusters of cameras are in areas of the materials handling facility that will not be frequently crossed by a user, or crossed with less frequency than other areas. For example, the borders 462A, 462B of clusters 460A and 460B are defined to cross along one or more inventory locations 432. Likewise, borders 462A, 462B, 462C, at clusters 460A, 460B, 460C cross at the ends of the aisles of inventory locations 432. Similar positioning of borders 462D, 462E, 462F, 462G corresponding to clusters 460D, 460E, 460F, 460G are also illustrated. As illustrated, the size and/or shape of the clusters may vary within the materials handling facility. Likewise, the number of cameras associated with a cluster may also vary.

In some implementations, the size of the cluster is designed to be as wide and long as possible to reduce the frequency with which users cross cluster boundaries. Likewise, as illustrated in FIG. 5, the field of view of cameras of adjacent clusters may overlap, thereby causing the clusters to overlap. For example, the cameras may be positioned so that the field of view of adjacent cameras intersect and begin to overlap approximately six feet above the surface of the materials handling facility. Overlapping the field of view of cameras in adjacent clusters results in user patterns representative of users being detected in multiple clusters as the user moves from one cluster to another. Each cluster processing system will identify the user pattern and send the corresponding location information and session identifier for the cluster to the cluster aggregation system. The cluster aggregation system will determine that the location information for the two clusters overlap and determine that the two user patterns correspond to a single user and normalize the information to a single location and single user identifier.

The overlap of clusters increases the ability for the system to monitor a user as they move throughout the materials handling facility and transition between clusters. The cluster aggregation system consolidates this information so that other systems (e.g., the inventory management system) receive a single representation of the user's location within the materials handling facility.

Figure 5:
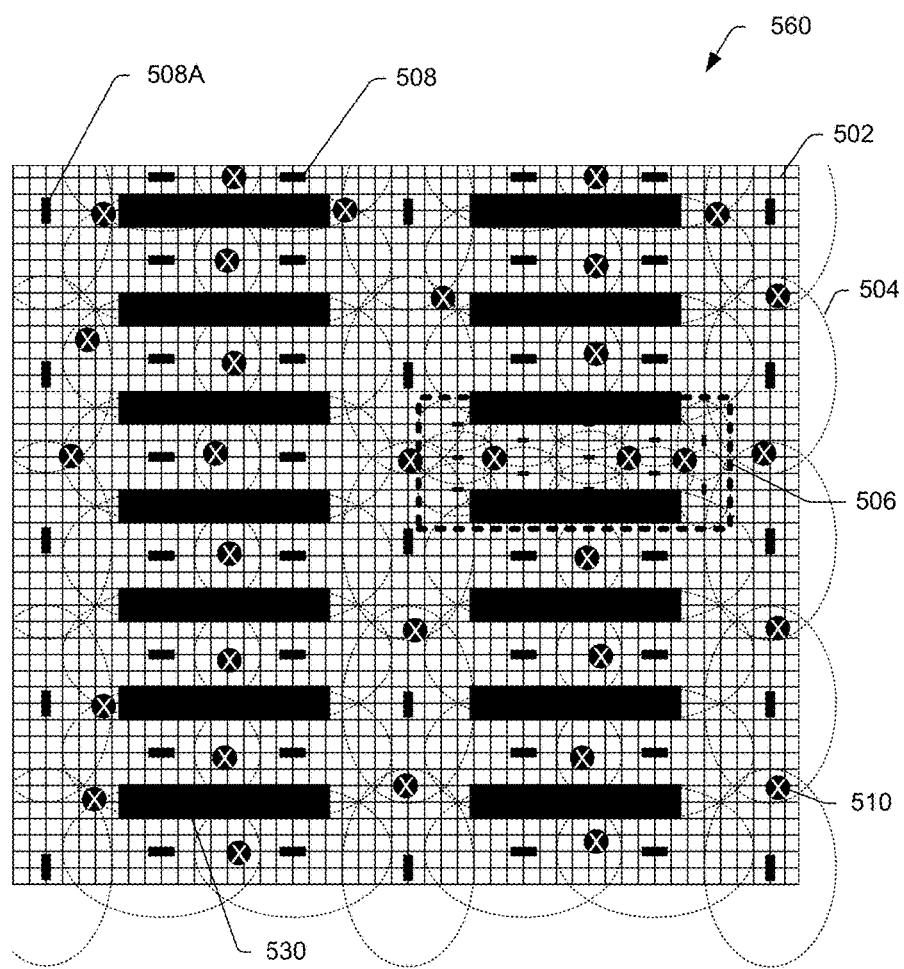
FIG. 5 is a block diagram of a top down view of a cluster, according to an implementation.

FIG. 5 is a block diagram of a top down view of a cluster 560, according to an implementation. Within each cluster 560 a plurality of cameras 508 may be positioned at defined locations so that the collective field of view of the cameras covers the entire surface of the portion of the materials handling facility corresponding to the cluster 560. In some implementations, a grid 502 system, physical or virtual, that is oriented with the shape of the materials handling facility (e.g., oriented with the walls of the materials handling facility). The grid 502 may be utilized to attach or mount cameras within the cluster 560 at defined locations with respect to the physical space of the materials handling facility. For example, in some implementations, the cameras may be positioned at any one foot increment from other cameras along the grid.

By mounting the cameras at defined locations along the grid, the cameras can be associated with a physical coordinate within the materials handling facility. For example, if the cluster 560 represents the north-west corner of a materials handling facility, the grid 502 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection, and any connected cameras, is known. In this example, camera 508A is positioned at grid coordinate B:3, which corresponds to the horizontal coordinate of the camera being positioned approximately two feet by three feet from the origin (in this example the upper left corner) of the cluster.

Because the field of view 504 of the cameras 508 may not by circular, the cameras may be placed at defined directions (e.g., 0, 90, 180, 270 degrees). The direction of the camera may be determined based on the field of view 504 coverage of adjacent cameras and/or the layout of objects on the surface of the materials handling facility. For example, if the camera 508 is being mounted in an aisle between two inventory locations the direction of the camera may be set so that the larger portion of the field of view 504 of the camera covers the length of the aisle.

The height of the cameras from the surface, the distance between camera placement and/or direction of the cameras 508 within the cluster 560 may vary depending on the layout of the materials handling facility, the lighting conditions in the cluster, the volume of users expected to pass through a portion of the cluster, the activities and/or volume of activities expected to occur at different locations within the cluster, etc. For example, cameras may typically be mounted every three to four feet in one direction and every four to five feet in another direction along the grid 502 so that the field of view of each camera overlaps, as illustrated in FIG. 5.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet, will result in the majority of users being within a field of view of a camera at all times. If the field of view of the cameras did not overlap until they were approximately three feet above the surface, as a user moves between the fields of view, the portion of the user that is taller than approximately three feet would exit one field of view and not enter the next field of view until the user has moved into that range of the camera. As such, a portion of the user is not detectable as they transition between fields of view. While this example describes overlapping camera fields of view at approximately seven feet above the surface of the materials handling facility, in other implementations the cameras may be positioned so that the fields of view begin to overlap at different heights (e.g., six feet, eight feet).

In some areas of the cluster, such as cluster area 506, cameras 508 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, user dwell time), high traffic areas, high value items, poor lighting conditions, etc. By increasing the amount of coverage, the image data increases, thereby increasing the likelihood that an activity or action will be property determined.

In some implementations, one or more markers 510 may be positioned throughout the cluster and used to aid in alignment of the cameras 508. The markers 510 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 510 may be placed on the surface of the materials handling facility. In other implementations, the markers 510 may be placed on a visible surface of an inventory location 530 within the cluster. In still other implementations, the inventory location 530 itself may be utilized as a marker. Alternatively, or in addition thereto, one or more inventory items that are viewable by the cameras may be used as the marker 510. In still other examples, the surface of the materials handling facility may have a detectable pattern, marks, defects, etc. that can be determined and used as markers 510 to align cameras.

In some implementations, the markers 510 may be temporarily placed at locations within the materials handling facility and used to calibrate the cameras. During calibration, the cameras may be aligned with respect to one another by aligning the position of the markers 510 in each camera's field of view. Likewise, the field of view of each camera may be determined and associated with coordinates of the materials handling facility.

The cameras 508 of a cluster may obtain images (still images or video) and process those images to reduce the image data and/or provide the image data to other components. As discussed further below with respect to FIG. 8, image data for each image or frame may be reduced to only include pixel information for pixels that have been determined to have changed. For example, baseline image information may be maintained for a field of view of a camera and image data for an image may be compared to the baseline image information. The image data may be reduced by removing or subtracting out pixel information that is the same in the image data as the baseline image information. Image data reduction may be done by each cameras. Alternatively, groups of cameras may be connected with a camera processor that processes image data from a group of cameras to reduce the image data of those cameras.

Figure 6:
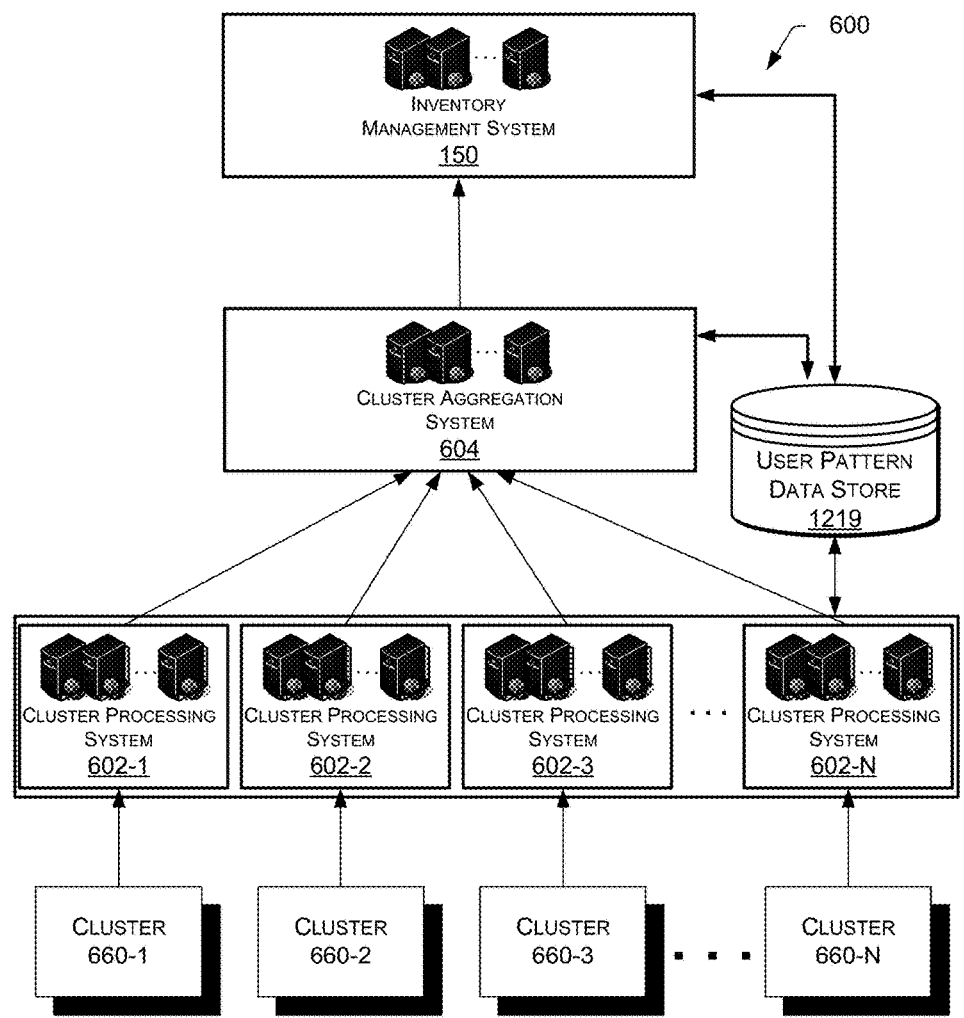
FIG. 6 is a block diagram of a camera hierarchy, according to an implementation.

FIG. 6 is a block diagram of a camera hierarchy 600, according to an implementation. The camera hierarchy 600 includes one or more clusters 660-1, 660-2, 660-3 . . . 660-N. Any number of cameras, up to a maximum supportable by the cluster processing system, may be included in each cluster 660. The maximum number of supportable cameras may be defined as the number of cameras that may be supported by a cluster processing system using a desired processing algorithm(s) without increasing the total processing time by more than a defined amount (e.g., 2%). Accordingly, the maximum number of cameras may vary based on the computation power and/or speed of the cluster processing system, the amount of image data provided by cameras of a cluster, the complexity and/or number of processing algorithms utilized to process the image data, etc. In some implementations, the maximum supportable number of cameras may be 500. Likewise, in some implementations, the number of cameras per cluster may vary between approximately 300 cameras and approximately 500 cameras.

Each camera and/or camera computing components may process image data to generate reduced image data. For example, baseline image information may be established for the field of view of each camera that identifies the temperatures, colors, shapes and/or depth information for objects (e.g., inventory locations, tables, work stations, surface area) that are typically within the field of view of the camera. As each image is obtained, the image data may be compared with the baseline image information to remove from the image data pixel information that is the same or similar in both the image data and the baseline image information. For example, the baseline image information may include pixel information for each pixel of image data that identifies the color values (RGB) of an object represented by the pixel, depth or distance of the object from the camera and/or the temperature of the object. The corresponding pixel information in the image data may be compared with the pixel information of the baseline image information to determine if the color values, depth, and/or temperature of the object has changed more than a tolerance threshold. Due to lighting changes, vibrations, temperature changes, etc. there may be some variation between the baseline image information and the image data. Such variations may fall below a threshold and not be considered as changes to the pixel information. The threshold may be any defined value and may be the same or different for different pixels, different cameras, different clusters, etc.

If the difference between the pixel information of the baseline image information and the corresponding pixel information of the image data is below the tolerance threshold, it may be determined that there has been no change at that pixel. If there is no change, the pixel information is removed from the image data. This comparison may be done for each pixel represented in the image data, thereby removing any image data that has not changed compared to the baseline image information. By removing image data that has not changed, the size and amount of the image data to be transmitted and processed is greatly reduced. In some implementations, if there is no change in any of the image data when compared to the baseline image information, the camera or camera computing component may send an empty image data file. The empty image data file may be used to notify the other processing systems that the camera is operational but there is no change in the image data. In other implementations, the camera and/or the camera computing component may not send any information, or may simply send an indicator acknowledging that the camera is operational.

As discussed above, the fields of view of cameras within a cluster may overlap with other cameras of the cluster. Image data may be sent for each field of view and processed by the cluster processing system 602, as discussed further below. Likewise, the fields of view on the perimeter of each cluster may overlap with the fields of view of cameras of an adjacent cluster.

Each cluster processing system 602-1, 602-2, 602-3 . . . 602-N may correspond with a cluster. In some implementations, there may be a one-to-one relationship between clusters 660 of a materials handling facility and a cluster processing system 602.

Each cluster processing system may be remote from the materials handling facility and may include one or more computing systems, such as a server system 350, that is configured to process reduced image data received from a corresponding cluster 660. For example, cluster processing system 602-1 may process reduced image data received from each camera of cluster 660-1. Cluster processing system 602-2 may process reduced image data received from each camera of cluster 660-2. Cluster processing system 602-3 may process reduced image data received from each camera of cluster 660-3. Any number of cluster processing systems may be established to support and process reduced image data from any number of clusters.

As discussed further below with respect to FIG. 9, each cluster processing system receives reduced image data from each of the clusters 660, and further reduces the data by generating a point cloud representative of that portion of the materials handling facility. The position of each pixel represented in the point cloud is aligned according to coordinates (horizontal and vertical) of the materials handling facility. A point cloud is a three-dimensional mapping of objects represented in the reduced image data. For example, the reduced image data includes pixel information from a camera at a known position in the materials handling facility. Based on the know position of the camera, each pixel can be associated with horizontal coordinates of the material handling facility. Likewise, the reduced image data may likewise include depth information that can be utilized as the vertical component for the point cloud.

Utilizing the information from the generated point cloud, the cluster processing system can identify user patterns. For example, the vertical component of pixels represented in the point cloud identify changes in the height of a location within the cluster. Adjacent clusters (e.g., clusters of the same or similar area generated from prior images) may also be considered and if there is a sufficient number of adjacent clusters with a similar change or increase in the vertical direction, it may be determined that those pixels represent a user pattern.

As discussed further below, in some implementations, the size, shape, color, temperature, etc. of the image data may also be considered in determining a user pattern. For example, the cluster processing system 602 may consider information stored in the user pattern data store 1219 from prior point clouds generated from prior reduced image data. For example, if a user pattern is determined in a prior point cloud based on reduced image data from the cluster at a similar location and/or having a similar size, shape, height, color, temperature, etc., that information may be stored in the user pattern data store 1219 and utilized to determine the user pattern in the current reduced image data. In still other implementations, the cluster processing system may utilize information received from the cluster aggregation system 604 to determine user patterns. For example, if a user is entering the field of view of cameras on the edge or perimeter of a cluster, the depth information for pixels of those cameras may begin to change. The cluster aggregation system 604 may provide information to the cluster processing system 602 identifying that a user pattern is expected to enter the cluster at defined locations based on information from other, adjacent clusters.

For each determined user pattern, the cluster processing system 602 generates location information and assigns a session identifier to the user pattern. The location information may include, for example, a center point of the user pattern, a particular aspect of the user pattern (e.g., the user's head and/or shoulders), etc. The location information and corresponding session identifier is provided to the cluster aggregation system 604.

While the examples described herein discuss the use of depth or vertical information for generating point clouds and determining user patterns, in other implementations, other information may be utilized in addition to or as an alternative to depth information for determining user patterns. For example, temperature information or heat signatures may be determined from reduced image data and utilized to determine a location of a user pattern within the materials handling facility. In another example, color changes may be utilized to determine user patterns.

The cluster aggregation system 604 receives from each of the cluster processing systems 602 location information and session identifiers for each of the determined user patterns. As discussed in further detail below with respect to FIG. 10, the cluster aggregation system aggregates the information obtained from each of the cluster processing systems and generates a unified representation of the materials handling facility, determines users corresponding to each user pattern and provides that information to other systems, such as the inventory management system 150.

In one implementation, the cluster aggregation system 604 may utilize the received location information for each user pattern and determine user patterns received from different cluster processing systems that overlap and/or represent the same user. As discussed above, the field of view of cameras within adjacent clusters may overlap to aid in monitoring the location of a user as they move through the materials handling facility. When the user moves between clusters, both cluster processing systems will provide user pattern location information for a period of time. The cluster aggregation system 604 receives this information and determines that the two user patterns are to be associated with a single user.

Likewise, for each user pattern, location information, and session identifier, the cluster aggregation system 604 may determine a user identifier. The user identifier may correspond to the user represented by the user pattern. In some implementations, the cluster aggregation system 604 may maintain in a session identifier mappings data store 1221 that includes a mapping relationship between the session identifier(s) assigned by the cluster processing systems and the corresponding user identifiers. As each series of user location information and session identifiers is received from the cluster processing systems 602, the cluster aggregation system 604 correlates the session identifiers with the user identifiers and updates the location of the user within the materials handling facility.

The cluster aggregation system 604 may then provide user identifiers and location information for each user located within the materials handling facility to other systems, such as the inventory management system 150. For example, the inventory management system 150 may detect an action, such as an item pick, at an inventory location within the materials handling facility. In detecting the item pick, the inventory management system 150 may query information provided by the cluster aggregation system 604 to determine a user identifier having location information corresponding to the location of the detected action (e.g., item pick). Utilizing this information, the inventory management system 150 may determine the user that performed the action.

Figure 7:
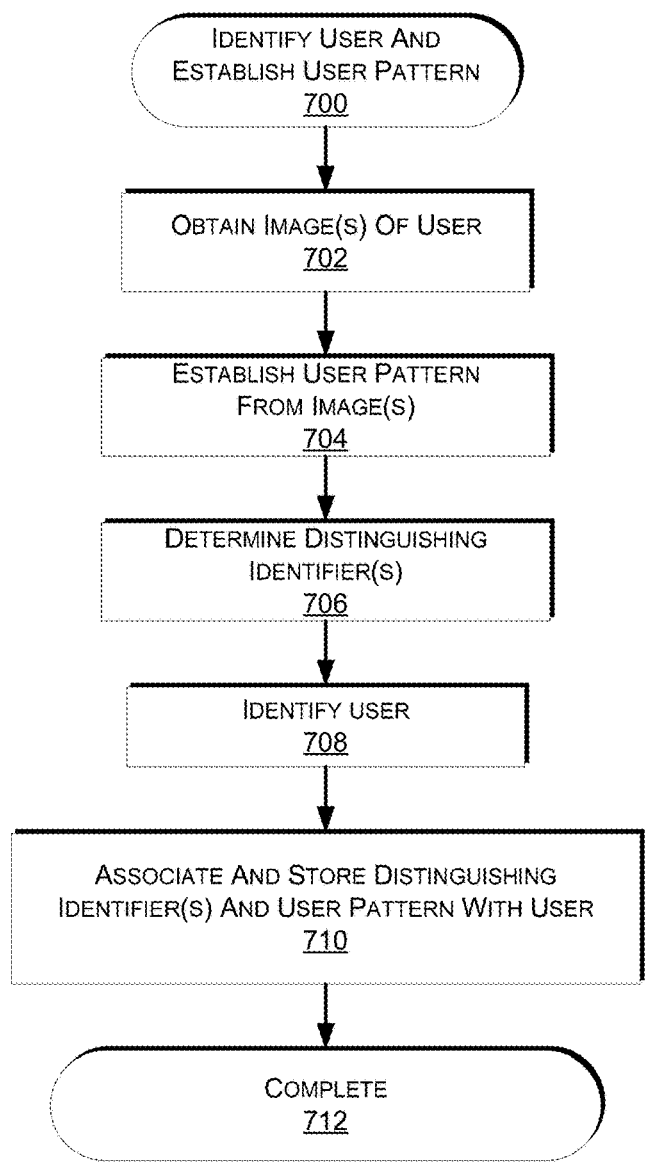
FIG. 7 is a flow diagram of an example process for identifying a user and establishing a user pattern, according to an implementation.

FIG. 7 is a flow diagram of an example process 700 for identifying a user and establishing a user patter, according to an implementation. The example process of FIG. 7, and each of the other processes and sub-processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine. Likewise, one or more of the operations may be considered optional.

The example process 700 begins by obtaining an image of a user as they arrive or enter the materials handling facility, as in 702. For example, in some implementations, there may be one or more dedicated check-in or entry locations. As the user arrives at the check-in location or passes through the entry location, one or more images of the user may be obtained. In some implementations, images of the user may be obtained from overhead with a camera posited above the user and oriented straight down, similar to the positioning discussed above for cameras of a cluster.

For example, a camera may be positioned at a defined location within the materials handling facility at a known height. When the user is located in the field of view of the camera, an image of the user may be obtained. The corresponding image data may include RGB color information for each pixel, depth information, temperature information, etc.

Utilizing the obtain image, a user pattern representative of the user is established, as in 704. For example, the image data may be processed to determine a height, size, and/or shape of the user pattern that is representative of the user. In some implementations, a maximum height of the user may be determined along with a size and/or shape of the user's head and/or shoulders. In some implementations, the image data may also be processed to determine any distinguishing identifiers that may aid in monitoring the location of the user, as in 706. For example, if the user is wearing a bright colored shirt (e.g., yellow shirt), the color of the shirt may be determined to be a distinguishing identifier that may be utilized by to aid in monitoring the location of the user within the materials handling facility.

In addition to generating a user identifier, the user is also identified, as in 708. User identification may be accomplished using a variety of techniques. For example, images of the face of the user may be obtained and processed using facial recognition algorithms, pattern matching algorithms, or the like, to identify the user. Alternatively, or in addition thereto, the user may provide an identification (e.g., user name, password), the user may present an identifier (e.g., identification badge, card), a RFID tag in the possession of the user may be detected, a visual tag (e.g., barcode, bokode, watermark) in the possession of the user may be detected, biometrics may be utilized to identify the user, etc.

Upon user identification, the user pattern and any distinguishing identifiers are associated with a user profile and corresponding user identifier, as in 710. Likewise, a session identifier may be generated and associated with the user profile. In some implementations, the session identifier may be utilized to identify the user profile and the user identifier may be provided by the cluster aggregation system to other systems. In some implementations, the actual identity of the user may not be discernable from the session identifier and/or the user identifier. In such an implementation, only systems that need access to the actual user information may be able to use the session identifier and/or user identifier to obtain access to user information.

Upon user identification and association with a user profile, the example process 700 completes, as in 712.

Figure 8:
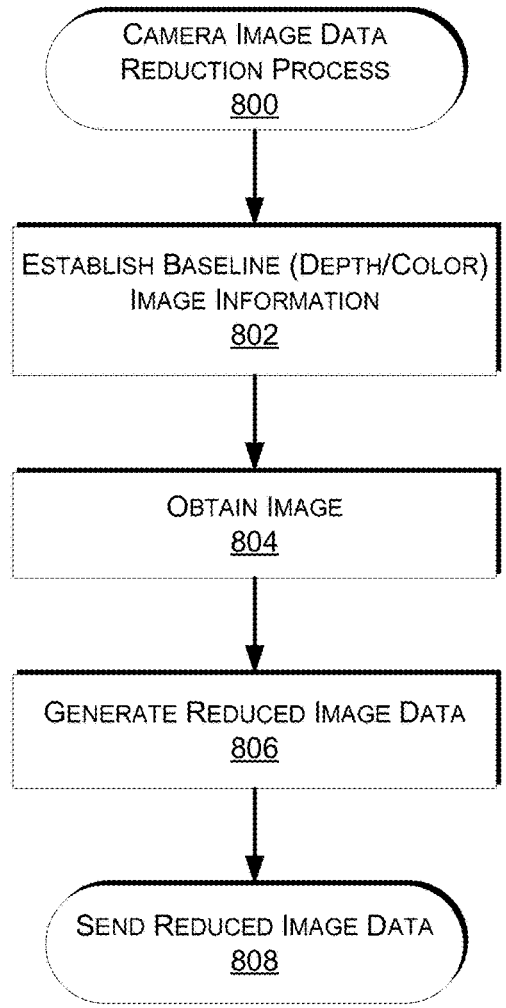
FIG. 8 is a flow diagram of an example image data reduction process, according to an implementation.

FIG. 8 is a flow diagram of an example camera image data reduction process 800, according to an implementation. The example process 800 may be performed for each camera within a cluster and/or for each cluster. In some implementations, the example process 800 may be performed using computing components of the camera itself as part of the image capture process. In other implementations, obtained images may be sent from the camera to a camera computing component and the camera computing component may perform the process 800. Cameras may be connected to the camera computing component via wired or wireless communication paths. In some implementations, the cameras may be connected with a camera computing component over a wired Ethernet connection or a wired universal serial bus (USB) connection. In addition to providing image data to the camera computing component over such a wired connection, the camera may be powered by the camera computing component and receive power over the wired connection (e.g., power over Ethernet or power over USB).

Multiple cameras of a cluster may provide image data to a camera computing component for processing. Each camera computing component may support, for example, twenty four cameras, receive image data from those cameras and generate reduced image data for each camera, in accordance with the example process 800. In other implementations, more or fewer cameras may be supported by a camera computing component.

The example process 800 begins by establishing baseline image information for each location of the materials handling facility, as in 802. For example, baseline image information may include the depth information for each location within the materials handling facility with respect to a camera, color information, temperature information, etc. In one implementation, each camera may obtain images and determine from those images areas within the field of view that remain unchanged in the image. These areas may be established as baseline image information. This may be done at initiation of the system when there is no activity in the materials handling facility and/or periodically.

For example, when there is no activity in the materials handling facility (e.g., no users) the example process 800 may be performed and the baseline image information may include a representation of the field of view of each camera when there is no activity. In other implementations, the example process 800 may be performed while there is activity in the materials handling facility. For example, a series of image data from a camera may be processed to determine locations that are not changing. This may correspond to baseline image information obtained when the materials handling facility has no activity or it may vary with time. For example, if a user picks an item from an inventory location and then returns the item to the inventory location but does not place it entirely back onto a shelf of the inventory location, a portion of the item may be included in images obtained by a camera. The change in the depth information for the pixels corresponding to the location of the item will change compared to an existing baseline image. However, because the item is stationary, the depth information for each subsequent image data will be similar. After a defined period of time (e.g., five minutes), the example process may determine that the item should be considered part of the baseline and the depth information for the pixels that represent the item may be updated so that the depth information corresponding to the item is part of the baseline.

In addition to establishing a baseline, images may be periodically obtained by the cameras, as in 804. As discussed above, the cameras may obtain a series of still images and/or ongoing video from which frames are extracted as image data. For each obtained image, the image data is compared with the baseline image information and pixels with the same or similar information are removed. The remaining pixels, the pixels having information that is different than the baseline image information are saved to generate reduced image data, as in 806. In some implementations, pixel information (e.g., color, depth, temperature) may be considered to be the same if the difference between the baseline image information and the current image data are within a tolerance threshold. Due to lighting changes, vibrations, temperature changes, etc. there may be some variation between the baseline image information and the image data. Such variations may fall below a tolerance threshold and not be considered as changes to the pixel information. The tolerance threshold may be any defined value and may be the same or different for different pixels, different cameras, different clusters, etc.

The reduced image data is then sent from the cluster, as in 808, and the example process completes.

Figure 9:
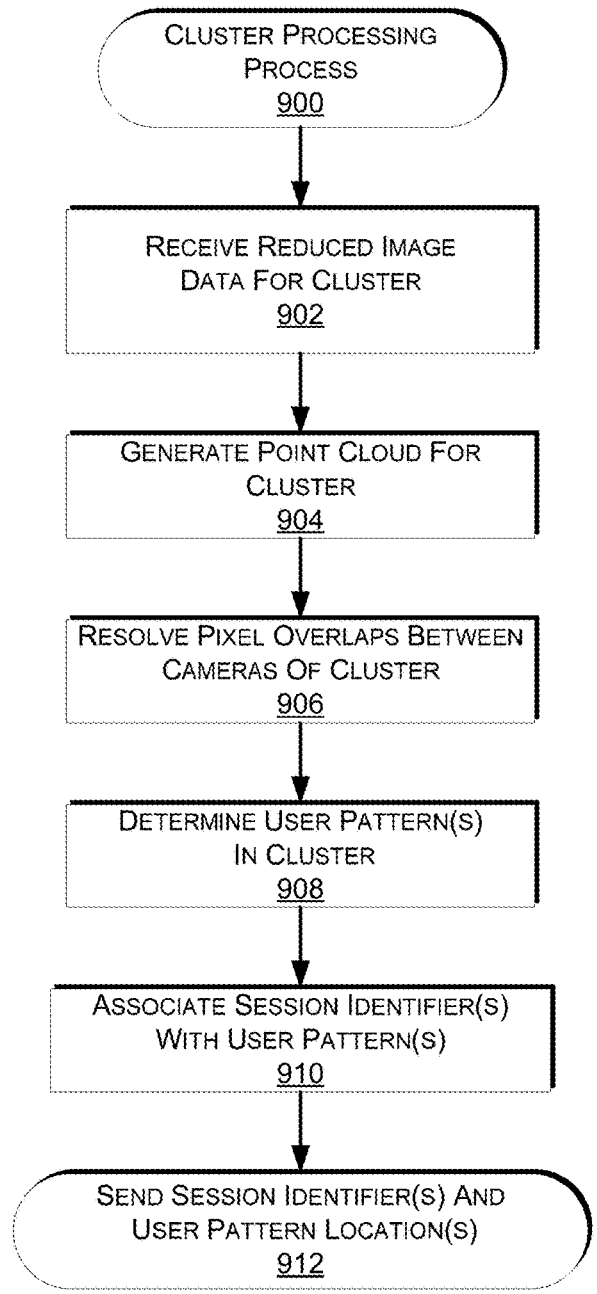
FIG. 9 is a flow diagram of an example process for processing image data for a cluster, according to an implementation.

FIG. 9 is a flow diagram of an example process 900 for processing image data for a cluster, according to an implementation. The example process 900 begins by receiving reduced image data from cameras of a cluster and/or from camera computing components, as in 902. The reduced image data may be received over a wired and/or wireless communication path. In some implementations, the cluster processing system(s) that perform the example process 900 may be remote from the corresponding cluster and/or remote from the materials handling facility. As discussed above, there may be a one-to-one relationship between clusters and cluster processing systems and each cluster processing system may perform the example process 900 for a corresponding cluster, but independent of other clusters and other cluster processing systems.

For each set of reduced image data, a point cloud is generated, as in 904. For example, the reduced image data for each camera may be associated with a defined physical location or coordinate (horizontal and vertical) within the materials handling facility. Because the location, orientation and field of view of each camera is known, the horizontal location of each pixel of information from the field of view of the camera can be correlated with a horizontal position within the materials handling facility. Likewise, the depth information included in the pixel information may be utilized as the vertical component for the pixel. Utilizing the horizontal and vertical components for each pixel included in the reduced image data received from each camera of the cluster, a point cloud may be generated.

In addition to generating a point cloud, the example process 900 may also identify any pixels that are overlapping and/or assigned to a same horizontal coordinate, as in 906. As discussed above, the field of view of one or more cameras within a cluster may overlap. The overlapping fields of view may result in pixel information from corresponding image data being assigned to a same horizontal location within the materials handling facility. However, because the cameras are potentially different distances from the overlapping horizontal locations, the depth information (distance of an object from the camera) may be different. The example process 900 resolves the overlap by selecting one set of the pixel information as representative of the physical location. For example, the example process may select the pixel information that has a larger vertical component. Alternatively, the example process may select the pixel information that has a smaller vertical component. In still another example, the example process 900 may select pixel information that is an average of the vertical component between the overlapping pixel information. In still another example, the example process 900 may consider the vertical component of adjacent pixels and select the pixel information having a vertical component that is closest to adjacent pixels.

Based on the point cloud, one or more user patterns are determined, as in 908. User patterns may be determined based on the size and/or shape of objects identified in the point cloud. For example, a user pattern may be determined if a defined number of adjacent pixels represented in the point cloud have a similar vertical component. Alternatively, if a defined number of pixels represented in the point cloud form a defined shape (e.g., a circle representative of a user's head, shoulders) a user pattern may be determined. In some implementations, the example process 900 may consider point clouds generated from multiple received sets of reduced image data and determine a user pattern based on information represented in point clouds generated from each set of reduced image data. For example, if the point cloud information identifies an object having a defined vertical component and/or shape that appears in multiple point clouds and is moving in a horizontal direction, a user pattern may be determined.

For each user pattern, a session identifier may be associated, as in 910. A session identifier may be any identifier, such as a random number. The session identifier may be generated by the example process 900 or associated with the user pattern based on prior information and/or based on information provided by the cluster aggregation system. For example, when the user is first identified, a user pattern determined, and a session identifier associated therewith, according to the example process 700, the location of that user pattern may be continuously monitored using the implementations discussed herein. As the user pattern moves throughout the materials handling facility, location information may be maintained and the session identifier may continually be associated with that location. When the example process 900 determines a user pattern, it may receive information that provides location information and a session identifier that is at or near the location of the determined user pattern. That information may be utilized to determine that the session identifier is to be associated with the determined user pattern.

Location information for the user pattern and the associated session identifier are then sent to the cluster aggregation system, as in 912. In some implementations, the location information may identify all locations determined to be associated with the user pattern. In other implementations, a center point of the user pattern and/or a center point within a particular shape of the user patter may be utilized as the location information. For example, a circular shape (e.g., user's head) may be determined in the user pattern and a center point within the circular shape may be determined and utilized as location information representative of the user pattern.

Processing reduced image data at each cluster processing system utilizing the example cluster processing process 900 results in the data being further reduced. Rather than providing images and/or location information for clusters, the cluster processing process may only provide session identifiers and location information for user patterns determined from the received reduced image data.

Figure 10:
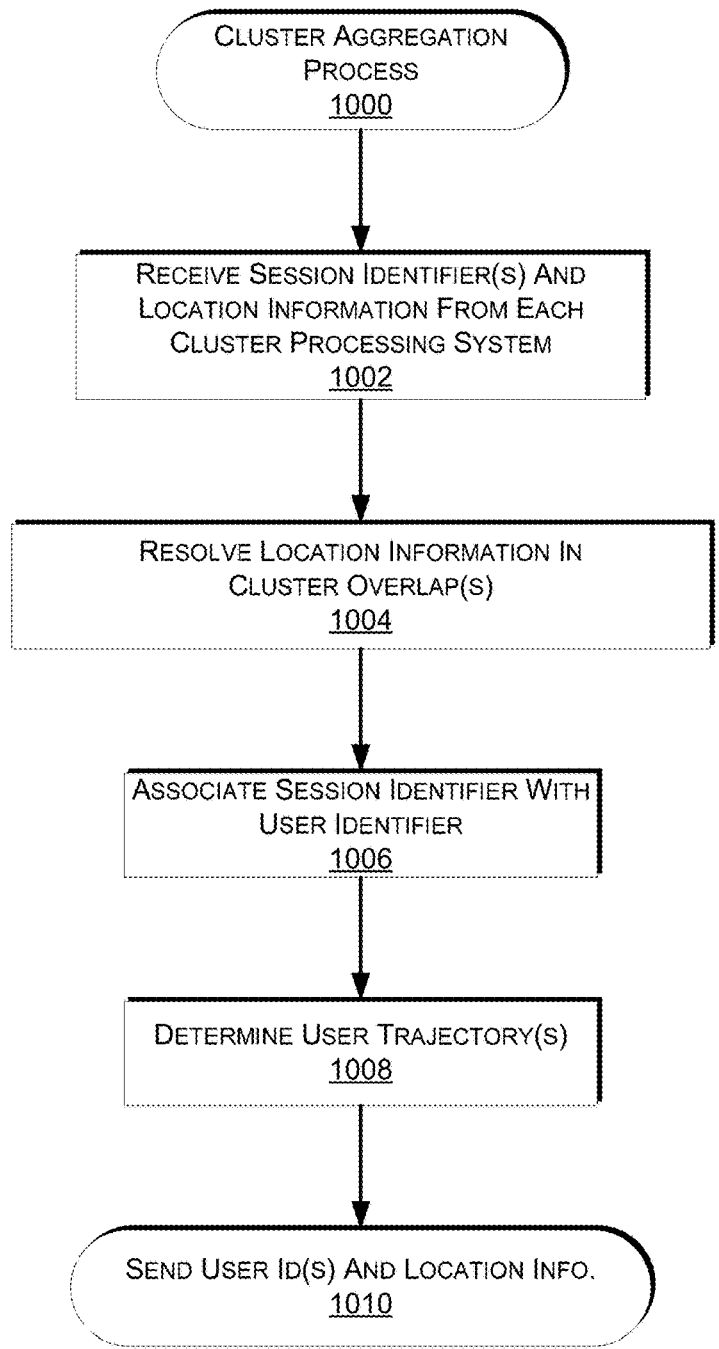
FIG. 10 is a flow diagram of an example cluster aggregation process, according to an implementation.

FIG. 10 is a flow diagram of an example cluster aggregation process 1000, according to an implementation. The example process 1000 begins upon receipt of session identifiers and user pattern location information from each cluster processing system, as in 1002. As discussed above, each cluster processing system that processes image data from cameras of a materials handling facility provides session identifiers and location information for determined user patterns to a cluster aggregation system. The cluster aggregation system performs the example process 1000.

Upon receipt of location information and session identifiers, the example process determines and resolves any overlaps in location information that are identified in locations of overlapping clusters. Similar to cameras within a cluster, cameras at the perimeter of adjacent clusters may have overlapping fields of view. When a user moves between clusters, they will be identified by each cluster for the portion of the overlap and as such, each cluster processing system will provide a session identifier and location information for the detected user pattern. Because the location information from each cluster may vary slightly due to the cameras being at different distances/perspectives, the example process 1000 determines overlapping and/or similar location information for user patterns reported from different clusters and determines if the two reported session identifies and location information correspond to the same user. For example, the example process 1000 may consider location information and session identifiers from prior points in time to determine a trajectory of a user and based on that trajectory determine if the two overlapping location information correspond to the same user.

For each session identifier or resolved session identifier and corresponding location information, the example process may associate the session identifier with a user identifier, as in 1006. The user identifier may be any unique identifier that is utilized to monitor the location of the user. For example, the user identifier may be the user identifier determined or established as part of the example process 700. Because the cluster aggregation system and the corresponding example process 1000 generate a complete view of users throughout the materials handling facility, the example process 1000 continually receives location information for the user pattern of the user from the time the user is identified. Utilizing this information, the example process can maintain information as to which session identifiers generated by the cluster processing systems correspond to which user identifiers.

In addition to determining and resolving overlapping location information for a user, the example process 1000 may determine an anticipated trajectory for each user based on the currently received location information and previously received location information for the user, as in 1008. For example, if a series of reported location information for a session identifier identifies that the user is moving down an aisle, the example process 1000 may determine that the user is likely to continue moving in that direction down the aisle.

Finally, the example process 1000 may provide and/or make available location information for each user identifier corresponding to each user within the materials handling facility and the corresponding user identifier, as in 1010. For example, the example process 1000 may provide location information for each user identifier to the inventory management system 150.

Figure 11:
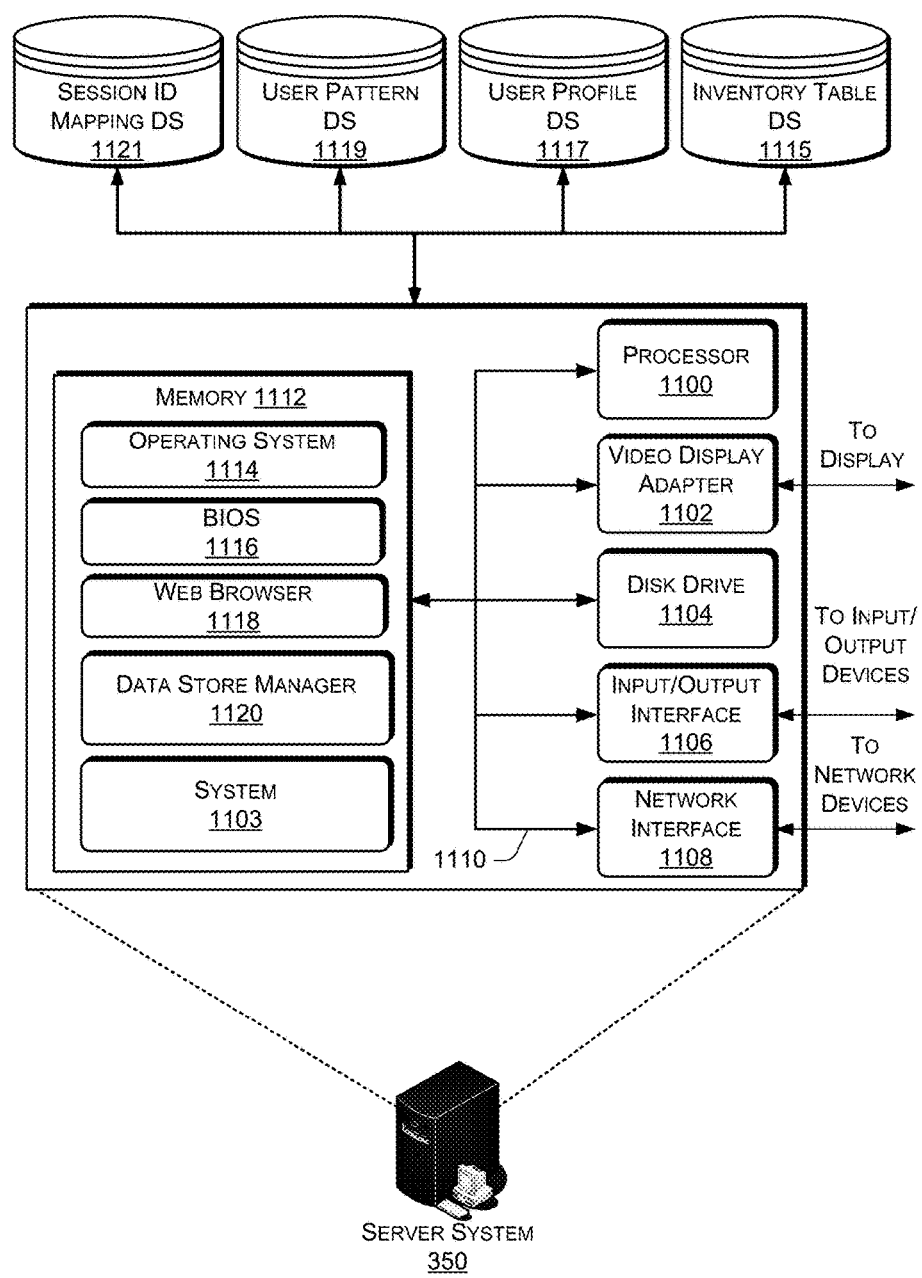
FIG. 11 is a block diagram of an illustrative implementation of a server system that may be used with various implementations.

FIG. 11 is a pictorial diagram of an illustrative implementation of a server system, such as the server system 350 that may be used in the implementations described herein. The server system illustrated in FIG. 11, or another similar server system, may be configured as a cluster processing system, the cluster aggregation system and/or for the inventory management system.

The server system 350 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 350 to monitor and configure operation of the server system 350. The input/output interface 1106 likewise communicates with external input/output devices not shown in FIG. 11, such as a mouse, keyboard, scanner, or other input and output devices that can be operated by an operator of the server system 350. The network interface 1108 includes hardware, software, or any combination thereof, to communicate with other computing devices. For example, the network interface 1108 may be configured to provide communications between the server system 350 and other computing devices via the network 302, as shown in FIG. 3.

The memory 1112 generally comprises random access memory (RAM), read-only memory (ROM), flash memory, and/or other volatile or permanent memory. The memory 1112 is shown storing an operating system 1114 for controlling the operation of the server system 350. A binary input/output system (BIOS) 1116 for controlling the low-level operation of the server system 350 is also stored in the memory 1112.

The memory 1112 additionally stores program code and data for providing network services. The data store manager application 1120 facilitates data exchange between the inventory table data store 1115, the user profile data store 1117, the user pattern data store 1119 and/or the session identifier mapping data store 1121.

As used herein, the term "data store" refers to any device or combination of devices capable of storing, accessing and retrieving data which may include any combination and number of data servers, databases, data storage devices and data storage media in any standard, distributed or clustered environment. The server system 350 can include any appropriate hardware and software for integrating with the data stores 1115-1121 as needed to execute aspects of the inventory management system 150.

The data stores 1115-1121 can include several separate data tables, databases or other data storage mechanisms and media for storing data relating to a particular aspect. For example, the data stores 1115-1121 illustrated include mechanisms for maintaining inventory information (e.g., item locations, images of item when properly positioned, depth map information for an item located on an inventory shelf, item features), user profile information, user pattern information, mappings between session identifiers and user identifiers, etc. Depending on the configuration and user of the server system 350 one or more of the data stores 350 may not be included or accessible to the server system 350. For example, if the server system is supporting the cluster processing system, the server system 350 may not include and/or be able to access the user profile data store 1117, the inventory table data store 1115 and/or the session ID mappings data store 1221.

It should be understood that there can be many other aspects that may be stored in the data stores 1115-1121. The data stores 1115-1121 are operable, through logic associated therewith, to receive instructions from the server system 350 and obtain, update or otherwise process data in response thereto.

The memory 1112 may also include the inventory management system, cluster processing system, or the cluster aggregation system, as discussed above and as generally illustrated by the system 1103. The corresponding system 1103 may be executable by the processor 1100 to implement one or more of the functions of the server system 350. In one implementation, the corresponding system 1103 may represent instructions embodied in one or more software programs stored in the memory 1112. In another implementation, the corresponding system 150 can represent hardware, software instructions, or a combination thereof.

It will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
  a first camera of a plurality of cameras associated with a cluster of cameras, the first camera positioned overhead within a materials handling facility and having a first field of view;
  a second camera of the plurality of cameras associated with the cluster of cameras, the second camera positioned overhead within the materials handling facility and having a second field of view that at least partially overlaps the first field of view;
  a processor; and
  a memory coupled to the processor and storing program instructions that when executed by the processor cause the processor to at least:
    receive first image data from the first camera, the first image data including a first plurality of pixels, each of the first plurality of pixels including respective color data and respective depth information representative of the first field of view;
    receive second image data from the second camera, the second image data including a second plurality of pixels, each of the second plurality of pixels including respective color data and respective depth information representative of the second field of view;
    generate, based at least in part on the first image data and the second image data, a three-dimensional representation of an object represented in at least a portion of the first image data and in at least a portion of the second image data, wherein generation of the three-dimensional representation includes:
      associating each of the first plurality of pixels with a respective physical location of the materials handling facility within the first field of view of the first camera;
      associating each of the second plurality of pixels with a respective physical location of the materials handling facility within the second field of view of the second camera;
      determining that a first pixel of the first plurality of pixels from the first camera is associated with a first location;
      determining that a second pixel of the second plurality of pixels of the second camera is associated with the first location, wherein the first location is within the first field of view that at least partially overlaps with the second field of view; and
      including, in the three-dimensional representation, a first color data and a first depth information corresponding to the first pixel as representative of the first location, without including a second color data and a second depth information corresponding to the second pixel in the three-dimensional representation;
    determine, based at least in part on the three-dimensional representation, a position of the object within the materials handling facility;
    associate a session identifier with the three-dimensional representation; and
    send the session identifier and position information representative of the position to a cluster aggregation system, without sending the three-dimensional representation.

2. The system of claim 1, wherein the program instructions that when executed by the processor to cause the processor to generate the three-dimensional representation further comprise instructions that cause the processor to at least:
  determine the three-dimensional representation based at least in part on one or more of: a shape of the three-dimensional representation as represented by depth information of the at least a portion of the first plurality of pixels and the at least a portion of the second plurality of pixels, color data of the at least a portion of the first plurality of pixels and the at least a portion of the second plurality of pixels, a previously determined location of the three-dimensional representation, or stored information.

3. The system of claim 1, wherein:
  a first horizontal coordinate and a second horizontal coordinate of each pixel of the three-dimensional representation correspond to a location within at least one of the first field of view or the second field of view; and a vertical coordinate of each pixel represented in the three-dimensional representation corresponds to depth information of the pixel.

4. The system of claim 1, wherein the program instructions that cause the processor to at least select first color data and first depth information corresponding to the first pixel as representative of the location, further include instructions that cause the processor to at least:

determine that the first depth information of the first pixel has a smaller vertical component than the second depth information of the second pixel; and select the first color data and the first depth information corresponding to the first pixel as representative of the first location based at least in part on the determination that the first depth information of the first pixel has a smaller vertical component than the second depth information of the second pixel.

5. The system of claim 1, wherein the program instructions that cause the processor to at least select color data and depth information corresponding to the first pixel as representative of the location, further include instructions that cause the processor to at least:

determine that the depth information of the first pixel has a vertical component that has a closer value to an adjacent pixel than a vertical component of the depth information of the second pixel; and select the color data and depth information corresponding to the first pixel as representative of the first location based at least in part on the determination that the vertical component of the depth information of the first pixel has a vertical component that has a closer value to the adjacent pixel than the vertical component of the depth information of the second pixel.

6. A system, comprising:

a first camera of a plurality of cameras associated with a cluster of cameras, the first camera positioned overhead within a materials handling facility and having a first field of view;

a second camera of the plurality of cameras associated with the cluster of cameras, the second camera positioned overhead within the materials handling facility and having a second field of view that at least partially overlaps the first field of view;

a cluster processing system configured to at least:

receive first image data from the first camera the first image data including a first plurality of pixels, each of the first plurality of pixels including respective color data and respective depth information representative of the first field of view;

receive second image data from a second camera, the second image data including a second plurality of pixels, each of the second plurality of pixels including respective color data and respective depth information representative of the second field of view;

generate, based at least in part on the first image data and the second image data, a three-dimensional representation of an object represented in at least a portion of the first image data and in at least a portion of the second image data, wherein generation of the three-dimensional representation includes:

associating with each pixel of the first plurality of pixels, a respective physical location of the materials handling facility represented by the pixel;

associating with each pixel of the second plurality of pixels, a respective physical location of the materials handling facility represented by the pixel;

determining that a first pixel of the first plurality of pixels from the first camera is associated with a first location;

determining that a second pixel of the second plurality of pixels of the second camera is associated with the first location; and including, in the three-dimensional representation, a first color data and a first depth information corresponding to the first pixel as representative of the first location, without including a second color data and a second depth information corresponding to the second pixel in the three-dimensional representation.

7. The system of claim 6, further comprising:

a cluster aggregation system configured to at least:

receive, from the cluster processing system, location information for the three-dimensional representation; and determine, for the three-dimensional representation, a user identifier corresponding to a user represented by the three-dimensional representation.

8. The system of claim 6, wherein generation of the three-dimensional representation is further based at least in part on one or more of:

a height from a surface within the materials handling facility of the three-dimensional representation compared to a stored height for a stored user pattern associated with a user;

a shape of the three-dimensional representation compared to a stored shape of the stored user pattern associated with the user;

a distinguishing identifier of the three-dimensional representation compared to a stored distinguishing identifier of the stored user pattern associated with the user; or a size of the three-dimensional representation compared to a stored size of the stored user pattern associated with the user.

9. The system of claim 6, wherein generation of the three-dimensional representation is further based at least in part on a monitored location of a user within the materials handling facility over a period of time, wherein the user is represented by the three-dimensional representation.

10. The system of claim 6, wherein:

a generation of the three-dimensional representation occurs when a user arrives at the materials handling facility, and a position of the three-dimensional representation is monitored as the user moves throughout the materials handling facility.

11. The system of claim 6, wherein:

a horizontal location of each pixel represented in the three-dimensional representation corresponds to the physical location determined for each pixel; and a vertical location of each pixel represented in the three-dimensional representation corresponds to a depth information included in the first image data for each pixel.

12. The system of claim 6, wherein the cluster processing system is remote from the materials handling facility, remote from the first camera, and remote from the second camera.

13. The system of claim 6, wherein the cluster processing system is further configured to at least:

determine a defined shape in the three-dimensional representation representative of at least a portion of a user; and determine a user represented by the three-dimensional representation based at least in part on the defined shape.

14. The system of claim 13, wherein the defined shape is representative of a head of the user, or a shoulder of the user.

\* \* \* \* \*

UNITED STATES PATENT AND TRADEMARK OFFICE
CERTIFICATE OF CORRECTION

PATENT NO. : 10,134,004 B1  
APPLICATION NO. : 14/582015  
DATED : November 20, 2018  
INVENTOR(S) : Frank Florian Liberato et al.

Page 1 of 1

It is certified that error appears in the above-identified patent and that said Letters Patent is hereby corrected as shown below:

On the Title Page

Item (12):
"Liberato, Jr., et al." should read --Liberato, et al.--.

Item (72):
The name of inventor "Frank Florian Liberato, Jr. (Kirkland, WA)" should read as --Frank Florian Liberato (Kirkland, WA)--.

Signed and Sealed this  
Twenty-second Day of December, 2020

Andrei Iancu  
*Director of the United States Patent and Trademark Office*